United States Patent
Popelard

(10) Patent No.: US 8,410,897 B2
(45) Date of Patent: Apr. 2, 2013

(54) CONTACT DETECTION DEVICE FOR VEHICULAR USE AND SECURITY DEVICE FOR VEHICULAR USE

(75) Inventor: Alexandre Popelard, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/058,973

(22) PCT Filed: Oct. 9, 2009

(86) PCT No.: PCT/JP2009/067597
§ 371 (c)(1),
(2), (4) Date: Feb. 14, 2011

(87) PCT Pub. No.: WO2010/041728
PCT Pub. Date: Apr. 15, 2010

(65) Prior Publication Data
US 2011/0181387 A1     Jul. 28, 2011

(30) Foreign Application Priority Data

Oct. 9, 2008   (JP) ................. 2008-262338

(51) Int. Cl.
  *G05B 19/00*   (2006.01)
  *G08B 5/22*    (2006.01)
  *H03K 17/94*   (2006.01)
  *G06F 3/041*   (2006.01)
  *G06K 9/00*    (2006.01)
(52) U.S. Cl. ............. 340/5.2; 340/8.1; 341/22; 341/27; 341/33; 345/173; 382/115; 382/119
(58) Field of Classification Search ............ 340/5.2; 341/22–33
See application file for complete search history.

(56) References Cited

U.S. PATENT DOCUMENTS
(Continued)

FOREIGN PATENT DOCUMENTS

| | | |
|---|---|---|
| JP | A-59-185270 | 10/1984 |
| JP | A-2-20778 | 1/1990 |

(Continued)

OTHER PUBLICATIONS

Japanese Office Action issued in Japanese Patent Application No. 2008-262338 on Jan. 5, 2010 (with translation).

(Continued)

*Primary Examiner* — George Bugg
*Assistant Examiner* — Renee Dorsey
(74) *Attorney, Agent, or Firm* — Oliff & Berridge, PLC

(57) ABSTRACT

Disclosed are a contact detection device for vehicular use and a security device for vehicular use that are capable of identifying whether contact is human-induced and that prevent erroneous detection due to raindrops and the like. A security device (10) is equipped with a contact detection device (11) comprising a contact unit (12), a detection unit (13), a standard detection pattern setting means (14) that sets standard detection patterns based on predefined patterns of human-induced contact to the contact unit, a detection signal identification means (15) that compares a detection signal detected by the detection unit (13) and the standard detection patterns that have been set and decides whether these match, and a contact identification signal output means (16), and is further equipped with a lock device (17) and a control device (18). The control device (18) comprises a security mode setting means (19) and a security mode specifying means (20) that specifies a security mode that has been predefined by the security mode setting means (19), and said control device causes the lock device (17) to execute the specified security mode.

5 Claims, 5 Drawing Sheets

U.S. PATENT DOCUMENTS

| | | | |
|---|---|---|---|
| 6,298,147 B1 * | 10/2001 | Ilan et al. | 382/119 |
| 2004/0263483 A1 * | 12/2004 | Aufderheide | 345/173 |
| 2005/0270276 A1 * | 12/2005 | Sugimoto et al. | 345/173 |
| 2006/0007174 A1 * | 1/2006 | Shen | 345/173 |
| 2007/0030165 A1 * | 2/2007 | Teshima et al. | 340/825.49 |

FOREIGN PATENT DOCUMENTS

| | | |
|---|---|---|
| JP | A-6-162888 | 6/1994 |
| JP | A-8-189239 | 7/1996 |
| JP | A-2002-57564 | 2/2002 |
| JP | A-2003-262058 | 9/2003 |
| JP | A-2004-169435 | 6/2004 |
| JP | A-2005-139634 | 6/2005 |
| JP | A-2006-344554 | 12/2006 |
| JP | A-2007-277865 | 10/2007 |
| JP | A-2008-14021 | 1/2008 |
| JP | A-2008-150897 | 7/2008 |

OTHER PUBLICATIONS

International Search Report issued in International Application No. PCT/JP2009/067597 on Jan. 12, 2010 (with translation).

* cited by examiner

| OPERATION PATTERN (EXAMPLE) | | | | OPERATION TIME PERIOD | DOOR LOCK MODE |
|---|---|---|---|---|---|
| S1 | S1 | ・・・ | Sn | | |
| →  | | | | <T1 | NORMAL LOCK |
| ← | | | | <T1 | NORMAL LOCK |
| ⇒ | | | | <T2 | DOUBLE LOCK |
| ⇐ | | | | <T2 | DOUBLE LOCK |
| ⇐ | | | | <T2 | DOUBLE LOCK |
| ⇐ | | | | <T2 | DOUBLE LOCK |
| →← | | | | <T3 | OPTION 1 |
| ←→ | | | | <T4 | OPTION 2 |

CONTACT DETECTION DEVICE FOR VEHICULAR USE AND SECURITY DEVICE FOR VEHICULAR USE

TECHNICAL FIELD

The present invention relates to a contact detection device (a touch sensor) and security device for vehicular use, and more particularly, to a security device for vehicular use including a contact detection device having a touch area that a subject touches and a sensor unit that detects a detection signal which is output when the subject touches the touch area; a lock device that locks a vehicle component; and a controller that controls the operation of the lock device based on the sensor information from the contact detection device.

BACKGROUND ART

Door-lock systems which are equipped with a lock device for vehicle doors for enabling locking and unlocking of vehicle doors by driver's key operation or the like are applied to most vehicles. In recent years, a door lock system which is capable of locking and unlocking of doors when a user carrying a portable device touches a contact detection device installed on a door handle is widely mounted. A door-lock system is one of security devices used to prevent theft of or from a vehicle. Other security devices mounted on vehicles include steering lock systems and immobilizer systems. One example of contact detection devices applicable to a door lock system or the like is an electrostatic capacitance sensor which is provided with a pair of electrodes used as a touch area that a subject touches and is capable of sensing a change in electrostatic capacitance.

A contact detection device such as the electrostatic capacitance sensor is generally provided with a sensor electrode mounted on a door handle. However, as the door handle may be come into contact with raindrops or the like, there is a risk that such a contact made by raindrops or the like is erroneously detected as a touch of user. As described above, the electrostatic capacitance sensors are sensors which detect a change in electrostatic capacitance. The electrostatic capacitance sensors are configured to capture the change in electrostatic capacitance caused by stray electrostatic capacitance of the human body. Therefore, because the electrostatic capacitance also changes due to stray electrostatic capacitance of raindrops, there are occasions when it is impossible to determine whether or not a touch is human-induced.

In light of such a situation, some systems have been developed in order to prevent an erroneous detection by an electrostatic capacitance sensor or the like due to raindrops or other factors. For Example, JP 2002-57564A discloses a human body detector including an electrostatic capacitance sensor that a human body touches, and a detecting unit that receives an output from the electrostatic capacitance sensor and distinguishes between a human body and raindrops to detect only a human body. It is also disclosed in JP 2002-57564A that the sensor unit performs the distinction between a human body and raindrops to detect only a human body by receiving the output from the electrostatic capacitance sensor based on a change in the output within a predefined time period.

Further, JP 6-162888A discloses a non-contact switch including a sensing unit having a sensor element in which a pair of electrodes are arranged close to each other on a substantially single plane, and a sensor circuit that outputs a detection signal when electrostatic capacitance between both of the electrodes decreases below a reference value when a human body comes closer. The sensing unit is configured such that a main sensor element is surrounded by multiple sensor elements. The sensor circuit includes a sensor unit that generates a detection signal for each of the sensor elements and a determination unit that generates an output signal only when a detection signal corresponding to the main sensor element is generated and the detection signal is not followed by another detection signal corresponding to another sensor element within a predefined time period.

PRIOR ART DOCUMENT

Patent Documents

Patent Document 1: JP 2002-57564A
Patent Document 2: JP 6-162888A

DISCLOSURE OF THE INVENTION

Objects to be Achieved by the Invention

However, in the device disclosed in JP 2002-57564A, because the stray electrostatic capacitance varies depending on each person, there may be some occasions when it is impossible to distinguish from the change ratio of raindrops. Therefore, it is impossible to reliably prevent an erroneous detection due to raindrops. Further, in the device disclosed in JP 6-162888A, because of the configuration of the sensing unit in which the main sensor element is surrounded by multiple sensor elements, the operation of the main sensor element may be difficult. For example, when the size of the main sensor element is enlarged, it would be difficult to prevent an erroneous detection due to raindrops. When the size is reduced, the operability is lowered such that a hand may touch on a surrounding undesired element. As described above, it is impossible to perfectly determine whether or not a touch is human-induced and to reliably prevent an erroneous detection due to raindrops or the like.

An object of the present invention is to provide a contact detection device and a security device for vehicular use which can determine whether or not a touch is human-induced to prevent an erroneous detection due to raindrops or the like.

Means for Achieving the Objects

A contact detection device (a touch sensor) for vehicular use according to the present invention includes a touch area that a subject touches and a sensor unit that detects a detection signal output when the subject touches the touch area. The contact detection device for vehicular use is mounted on a vehicle and characterized by including a reference detection pattern setting unit that sets a predefined reference detection pattern corresponding to a pattern of human-induced touch to the touch area; a detection signal identifying unit that compares the detection signal detected by the sensor unit and the set reference detection pattern to determine whether or not these match; and a touch recognition signal output unit that outputs a touch recognition signal when it is determined that the detection signal detected by the sensor unit and the set reference detection pattern match.

Further, it is preferable that a plurality of touch areas are provided and the predefined pattern of human induced touch to the touch areas includes a pattern that defines a touch sequence to the touch areas.

Further, it is preferable that the predefined pattern of touch that defines a touch sequence to the touch areas includes a pattern that defines a time period from the start to the end of the touch or a time interval between the touches.

A security device for vehicular use according to the present invention includes the contact detection device for vehicular use having the above described configuration; a lock device that locks a vehicle component; and a controller that controls an operation of the lock device based on a touch recognition signal from the contact detection device for vehicular use. The controller includes a security mode setting unit that sets a security mode corresponding to the touch recognition signal output from the contact detection device; and a security mode selecting unit that selects, in response to the touch recognition signal output from the contact detection device, a predefined security mode corresponding to the touch recognition signal, wherein the selected security mode is executed by the lock device.

In another configuration according to the present invention, a security device for vehicular use includes a touch area that a subject touches and a sensor unit that detects a detection signal output when the subject touches the touch area, a lock device that locks a vehicle component, and a controller that controls an operation of the lock device based on the detection signal from the contact detection device, wherein the controller includes a mode-definition detection pattern setting unit that sets a mode-definition detection pattern defining a predefined security mode corresponding to a predefined pattern of human-induced touch to the touch area; a detection signal determining unit that compares the detection signal detected by the sensor unit and the set mode-definition detection pattern to determine whether or not these match; and a security mode specifying unit that specifies a predefined security mode corresponding to the mode-definition detection pattern when it is determined that the detection signal detected by the sensor unit and the set mode-definition detection pattern match, wherein the specified security mode is executed by the lock device.

Further, in a security device for vehicular use according to the present invention, it is preferable that the touch area of the contact detection device is provided on a vehicle door handle.

Further, in a security device for vehicular use according to the present invention, it is preferable that at least two types of security modes are provided.

Effects of the Invention

In accordance with a contact detection device for vehicular use according to an embodiment of the present invention, it is possible to determine whether or not a touch is human-induced, and thus to prevent an erroneous detection due to raindrops or the like because the contact detection device includes a reference detection pattern setting unit that sets a predefined reference detection pattern based on a pattern of human-induced touch to a touch area; a detection signal identifying unit that compares the detection signal detected by the sensor unit and the set reference detection pattern to determine whether or not these match; and a touch recognition signal output unit that outputs a touch recognition signal when it is determined that the detection signal detected by the sensor unit and the set reference detection pattern match. In other words, the reference detection pattern that is set by the reference detection pattern setting unit is a predefined pattern of human-induced touch to the touch area, and the identification of the detection signal cause by a touch is performed based on the human-induced touch pattern. Therefore, because a contact made by raindrops or the like that is not human-induced contact does not reproduce the predefined pattern of human induced touch, the detection signal and the reference detection pattern do not match. Therefore, because it is possible to determine that the contact made by raindrops or the like is not a human-induced touch, an erroneous detection due to raindrops or the like can be prevented. Furthermore, in this configuration, because it is possible to determine whether or not a touch out of human-induced touches is intentional, the activation of a device due to an unintentional touch can be also prevented.

Furthermore, accuracy in determining whether or not a touch is human-induced can be further improved by using a configuration in which, with multiple touch areas provided, the predefined pattern of human induced touch to the touch areas includes a pattern that defines a touch sequence among the touch areas.

Further, an accuracy in determining whether or not a touch is human-induced can be even further improved by using a configuration in which the predefined pattern of touch that defines a touch sequence to the touch areas includes a pattern that defines a time period from the start to the end of the touch or a time interval between the touches. In this configuration, an erroneous detection can be prevented even when, for example, raindrops flow along the arrangement direction of the multiple touch areas.

In accordance with a security device for vehicular use according to an embodiment of the present invention, it is possible to reliably prevent an activation of the security device due to an erroneous detection by activating the security device only when a human-induced and intentional touch operation is performed. This is enabled by the security device including the contact detection device for vehicular use having the above described configuration; a lock device that locks a vehicle component; and a controller that controls an operation of the lock device based on a touch recognition signal from the contact detection device for vehicular use, wherein the controller includes a security mode setting unit that sets a security mode corresponding to the touch recognition signal output from the contact detection device; and a security mode selecting unit that selects, in response to the touch recognition signal output from the contact detection device, a predefined security mode corresponding to the touch recognition signal.

Further, good operability can be assured by using a configuration in which the touch area of the contact detection device is provided on a vehicle door handle. It should be noted that although the door handle is located where raindrops easily make contact, in the security device for vehicular use according to an embodiment of the present invention, it is possible, as described above, to activate the security device only when a human-induced and intentional touch is performed.

Further, appropriate security in accordance with a user need can be realized by using a configuration in which at least two types of security modes are provided. By setting multiple reference detection patterns corresponding to multiple touch patterns and multiple touch recognition signals, and by defining a predefined security mode for each of the multiple touch recognition signals, it becomes possible to perform a desired security mode simply by changing an operation pattern to the contact detection device, that is, a touch pattern to the touch area.

Figure 1:
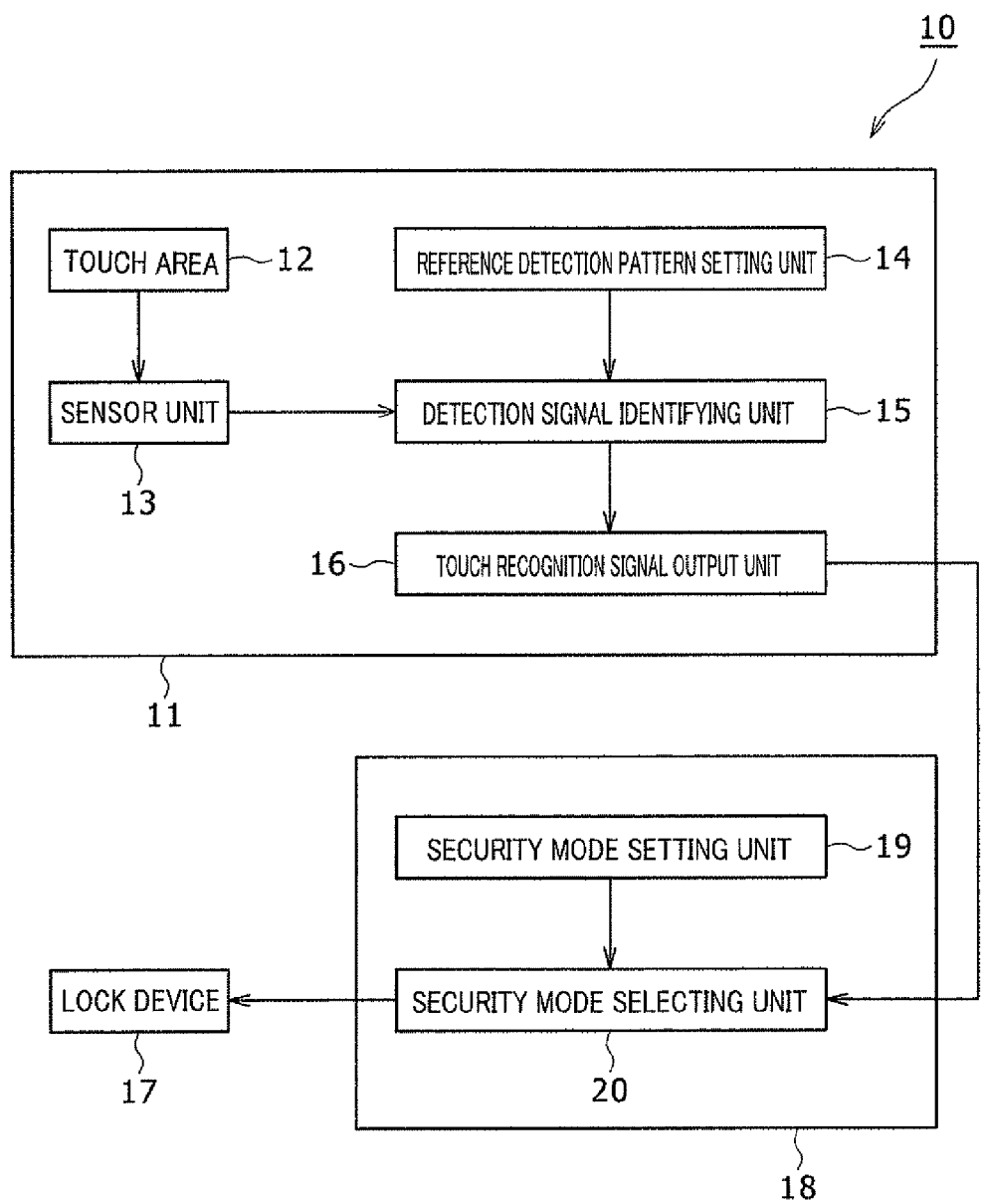
FIG. 1 is a block diagram showing a configuration of a security device for vehicular use equipped with a contact detection device.

REFERENCE NUMERALS 10, 10t security device for vehicular use, 11, 11t contact detection device, 12 touch area, 13 sensor unit, 14 reference detection pattern setting unit, 15 detection signal identifying unit, 16 touch recognition signal output unit, 17 lock device, 18, 18t controller, 19 security mode setting unit, 20 security mode selecting unit, 21 mode-definition detection pattern setting unit, 22 detection signal determining unit, 23 security mode specifying unit, 24 door handle, 25 unlock sensor, 26 vehicle door.

BEST MODE FOR CARRYING OUT THE INVENTION

Figure 2:
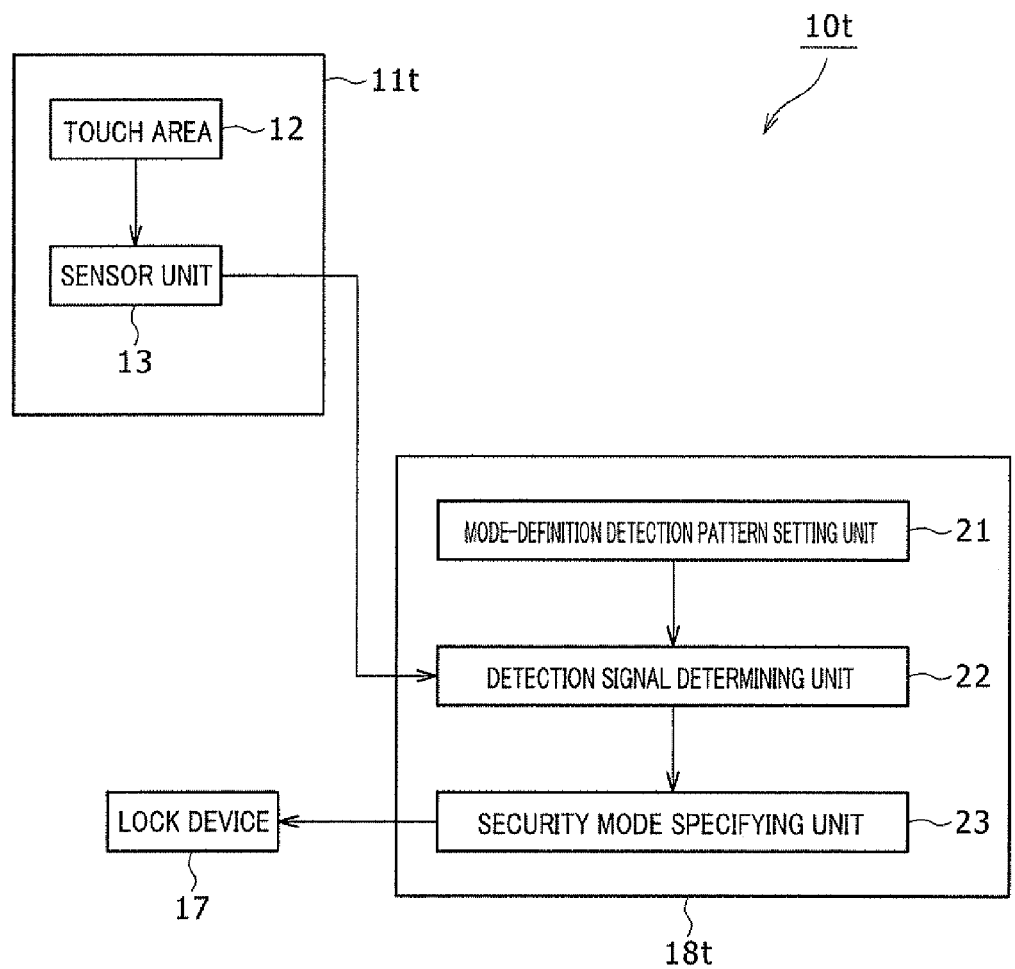
FIG. 2 is a block diagram showing another configuration of a security device for vehicular use equipped with a contact detection device.

An embodiment according to the present invention is described in detail below by referring to the attached drawings. FIG. 1 is a block diagram showing a configuration of a security device for vehicular use equipped with a contact detection device (a touch sensor) for vehicular use. FIG. 2 is a block diagram showing another configuration of a security device for vehicular use.

As shown in FIG. 1 and other portions, a security device for vehicular use 10 (hereinafter referred to as "security device 10") includes a contact detection device 11 as one of its elements. The security device 10 can be activated by a user by simply touching the contact detection device 11. The contact detection device 11 includes a touch area 12 that a subject touches, and a sensor unit 13 that detects a detection signal output when the subject touches the touch area 12.

As the contact detection device 11, an electrostatic capacitance sensor or the like is applicable. The electrostatic capacitance sensor is a sensor including a sensor electrode as the touch area 12. The capacitor sensor senses a touch by a subject by observing a change in electrostatic capacitance which is caused when the subject touches the sensor electrode. The electrostatic capacitance sensor includes a sensor resonance circuit and detector circuit (both not shown). The sensor resonance circuit includes a sensor electrode (touch area 12) whose electrostatic capacitance changes due to stray electrostatic capacitance when a dielectric body (subject) such as a human body touches. The sensor electrode is connected to a resonance circuit including a coil and capacitor (both not shown) to which a constant frequency voltage is supplied from a power supply. Therefore, the sensor resonance circuit outputs a constant frequency voltage in a normal state where nothing is touching the sensor electrode. When the electrostatic capacitance is changed when a subject touches the sensor electrode, the sensor resonance circuit outputs, in response to the change in the electrostatic capacitance, a voltage having an amplitude changed from the constant frequency voltage (that is, a detection signal is output). The detector circuit detects a resonance voltage which is output from the sensor resonance circuit. The unit which includes the detector circuit is a sensor unit 13.

Human bodies have a certain stray electrostatic capacitance. The electrostatic capacitance sensor senses a human-induced touch by sensing the certain stray electrostatic capacitance of a human body. However, the stray electrostatic capacitances of human bodies are variable and dielectric bodies other than a human body such as raindrops also have stray electrostatic capacitance. Thus, because dielectric bodies other than a human body can be a subject of the electrostatic capacitance sensor, there is a risk that an erroneous detection can be caused by raindrops or the like. The contact detection device 11 is a device whose object is to determine whether or not a touch is human-induced. As shown in FIG. 1, the contact detection device 11 includes a reference detection pattern setting unit 14, detection signal identifying unit 15, and touch recognition signal output unit 16, as elements to prevent erroneous detection due to raindrops or the like by identifying a human-induced touch pattern of the touch area.

The detection pattern setting unit 14 has a function to set a predefined reference detection pattern corresponding to a pattern of human-induced touch to the touch area 12. The reference detection pattern is not limited to any kind as long as the pattern can be compared with a detection signal detected by the sensor unit 13. However, it is preferable that the reference detection pattern is an electric signal similar to the detection signal. It should be noted that, as described below, the reference detection pattern is used as a reference to identify a human-induced, or a human-induced and intentional, touch by determining whether or not a detected detection signal corresponds to a human-induced touch pattern. Therefore, the predefined pattern of touch to the touch area 12 is set such that the pattern cannot be reproduced by raindrops, and thus when the pattern is performed, the touch is easily identified as a human-induced touch.

When a single touch area 12 is provided, the touch pattern can be a human-induced pattern which defines a time period indicating duration of touch to the touch area 12, the number of touch times within a unit of time, rhythm of touch, or the like. For example, a touch pattern can define that the touch period is 3 seconds or more, the number of times in 3 seconds is 3 times, or a rhythm of press-press-pause is repeated twice. The detection pattern setting unit 14 sets a reference detection pattern corresponding to such touch patterns.

It is also possible to install multiple touch areas 12 and to define a reference detection pattern which corresponds to a touch pattern defining a touch sequence of these touch areas 12. Further, it is also possible to define, with the touch pattern, a time interval between touches and a total touch duration time in addition to the touch sequence. It should be noted that although the setting of the reference detection pattern may be fixed at the time of manufacture of the contact detection device 11, it is also possible to allow a user to customize the setting to enable an easy operation by using the touch areas 12 or other input devices (not shown). Furthermore, by defining multiple touch patterns, multiple reference detection patterns may be set corresponding to the multiple touch patterns.

The detection signal identifying unit 15 has a function to compare between the detection signal detected by the sensor unit 13 and the set reference detection pattern to determine whether or not these match. The detection signal detected by the sensor unit 13 may be a detection signal caused by raindrops. On the other hand, the reference detection pattern is a predefined signal indicating a human-induced touch. Therefore, it is possible to determine whether or not a touch is human-induced by determining whether or not these match. It should be noted that it is preferable to decide the matching level of these signals such that an erroneous detection can be reliably prevented while allowing a deviation of operation (touch) by an operator.

The touch recognition signal output unit 16 has a function to output a touch recognition signal when it is determined that the detection signal detected by the sensor unit 13 and the set reference detection pattern match. Therefore, the touch recognition signal can be considered to indicate that the above-described predefined touch pattern is performed. Because the above-described touch pattern is human-induced and raindrops or the like cannot reproduce the pattern, an output of the touch recognition signal indicates that the human-induced touch pattern is performed. The output touch recognition signal is sent to a system which requires sensor information from the contact detection device 11. The signal is used to control the system. For example, in a vehicle security device 10 shown in FIG. 1, the touch recognition signal is sent from the touch recognition signal output unit 16 to a security mode selecting unit 20 of the controller 18.

Each of the contact detection device 11 and controller 18 includes a CPU, a storage device that stores control programs and a set reference detection pattern, a setting input device of the reference detection pattern or the like, and an input/output port. Both of the contact detection device 11 and controller 18 can be configured by a computer. Functions of each unit of the contact detection device 11 and controller 18 can be performed by executing software. Specifically, the functions can be performed by executing a control program defining control sequences stored in the storage device.

As shown in FIG. 1, the security device 10 which includes the contact detection device 11 having the above configuration further includes a lock device 17 that locks a vehicle component, and a controller 18 that controls the operation of the lock device 17 based on the contact detection device information from the contact detection device 11. The lock device 17 has a function to lock a vehicle component. Examples of vehicle components to be locked by the lock device 17 are a vehicle door 26, steering unit, and engine. The configuration of the lock device 17 may change depending on the components to be locked. As the configuration of the lock device 17 is not specifically limited, a well-known configuration can be used.

The controller 18 is a device to control the operation of the lock device 17 based on contact detection device information from the contact detection device 11, more specifically, a touch recognition signal. In other words, as the touch recognition signal is a signal which is output when a pattern of human-induced touch is performed, the vehicle security device 10 can control the operation of the lock device 17 in accordance with the touch pattern (hereinafter referred to as "operation pattern" or "touch operation pattern") to the touch area 12 by a driver. The controller 18 includes a security mode setting unit 19 and security mode selecting unit 20 in order to control the operation of the lock device 17 in accordance with the control recognition signal. The controller 18 has a function to instruct the lock device 17 to perform the security mode selected by using the security mode selecting unit 20.

The security mode setting unit 19 has a function to set a security mode corresponding to a touch recognition signal output from the contact detection device 11. As described above, because the touch recognition signal is a signal based on a human-induced and intentional touch, it becomes possible, by setting a predefined security mode corresponding to the signal, to execute a predefined security mode by selecting the security mode using the operation pattern of the touch area 12. It should be noted that the security mode indicates various locking types of vehicle components available by the security device 10. When the vehicle security device 10 has multiple security modes, multiple reference detection patterns are set corresponding to multiple touch patterns in the contact detection device 11. Multiple touch recognition signals corresponding to multiple reference detection patterns are provided in order to set security modes respectively corresponding to each of the multiple touch recognition signals.

When a touch recognition signal is output from the contact detection device 11, the security mode selecting unit 20 recognizes the touch recognition signal and selects a security mode which is predefined corresponding to the signal by the security mode setting unit 19. In other words, the security mode selecting unit 20 recognizes the touch recognition signal and selects (specifies) the security mode defined by the recognized touch recognition signal in order to execute the security mode which is intended by an operator. More specifically, the selection of the security mode is performed by matching the received touch recognition signal and the information set by the security mode setting unit 19.

As shown in FIG. 2, it may be also possible to provide, with a controller 18t of the security device 10 (hereinafter referred to as "security device 10t"), a function to determine whether or not a touch is human-induced. The controller 18t includes a mode-definition detection pattern setting unit 21, detection signal determining unit 22, and security mode specifying unit 23 in order to receive a detection signal from a sensor unit 13 of a contact detection device 11t to determine whether or not the touch signal indicates a human-induced touch, and controls the operation of the lock device 17 based on the touch pattern when it is determined that the touch is human-induced.

The mode-definition detection pattern setting unit 21 has a function to set a mode-definition detection pattern which defines a predetermined security mode corresponding to a predefined pattern of human-induced touch to the touch area 12. It should be noted that the mode-definition detection pattern to be set here can be set in a similar manner to the reference detection pattern set by the reference detection pattern setting unit 14 except that a security mode is defined.

The detection signal determining unit 22 has a function to compare a detection signal detected by the sensor unit 13 and a set mode-definition detection pattern to determine whether or not these match. Therefore, the detection signal determining unit 22 has the same function as the detection signal identifying unit 15 except that the detection pattern to be compared is the mode-definition detection pattern which defines a security mode. Similarly to the reference detection pattern, whether or not a touch is human-induced can be determined by determining whether or not the detection signal corresponding to the performed touch pattern and the mode-definition detection pattern match.

When the detection signal detected by the sensor unit 13 and the set mode-definition detection pattern match, the security mode specifying unit 23 specifies a security mode which is predefined corresponding to the mode-definition detection pattern. Therefore, the security mode specifying unit 23 has the same function as the security mode selecting unit 20. The security mode is specified by matching the received detection signal and the information set by using the mode-definition detection pattern setting unit 21.

As a security device 10 equipped with a contact detection device 11, a door lock system in which a touch area 12 is mounted outside a vehicle is generally preferable. Other than door lock systems, the contact detection device 11 is also applicable to a steering lock system or immobilizer system. The steering lock system is a system which mechanically prevents the steering operation. The immobilizer system is a system which prevents the operation of ignition and a fuel supply to the engine. The security device 10 is described below by using a door lock system as an example.

The door lock system is formed from, for example, a mobile device carried by a user and a vehicle-mounted device. The vehicle-mounted device is equipped with an antenna and authenticator (both not shown) which are mounted on a door handle 24. The authenticator performs user authentication by communicating with the mobile device when the user carrying the mobile device is located outside of a vehicle and within a predefined distance from the vehicle. When the user is authenticated as a valid user, the contact detection device 11 enters into a sensor ready state and the use of the contact detection device 11 becomes possible.

Figure 3:
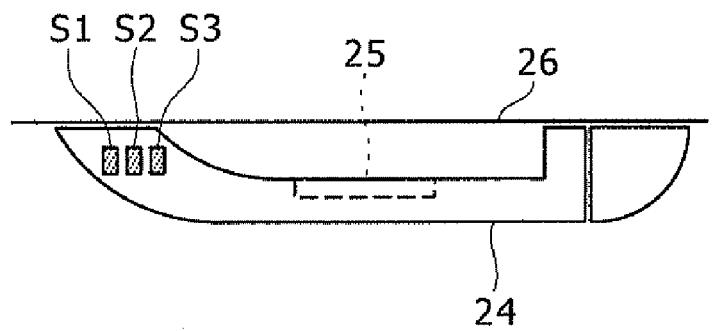
FIG. 3 is a drawing showing an embodiment in which, in a door lock system, a touch area of a contact detection device is mounted on a door handle.

FIG. 3 shows an embodiment in which multiple touch areas 12 are mounted on a door handle 24. As described above, an electrostatic capacitance sensor can be applied as the contact detection device 11. In the following description, it is assumed that the contact detection device 11 is an electrostatic capacitance sensor and the touch areas 12 are sensor electrodes (hereinafter referred to as "sensor electrode S"). As shown in FIG. 3, three of the sensor electrodes S are aligned on the top surface of door handle 24 mounted on a vehicle door 26. By providing the sensor electrodes S on the door handle 24, more specifically, on the top surface of the door handle 24, a good operability can be obtained. It should be noted that the door handle 24 is located where raindrops easily make contact. However, in accordance with the security device 10, because it is possible to operate the security device 10 only when a touch is human-induced and intentional as described above, the sensor electrodes S can be provided where a user can easily operate them. In view of operability and design, a preferable arrangement of the sensor electrodes S is to align the sensor electrodes S at regular intervals in the longitudinal direction of the door handle 24. However, the arrangement can be freely modified depending on the shape of the door handle 24, the number of the door lock modes, or the like.

Figure 4:
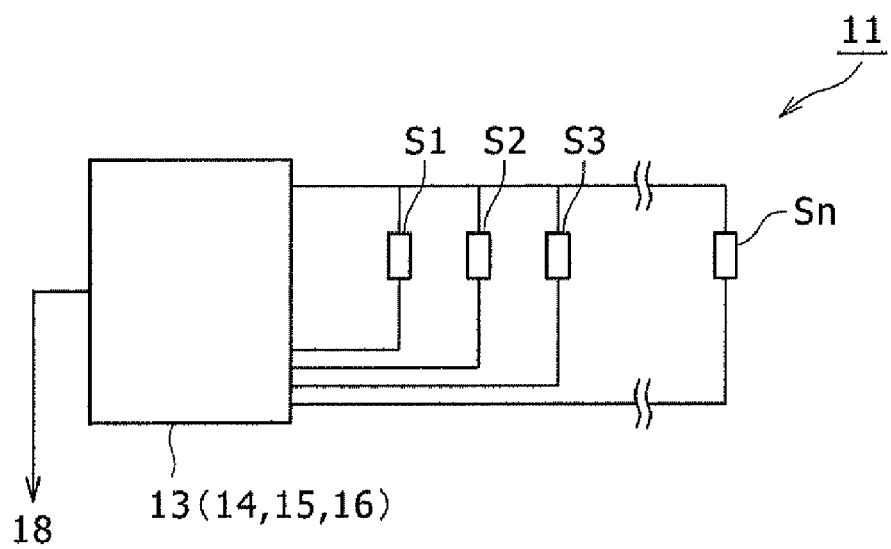
FIG. 4 is a block diagram showing a contact detection device equipped with multiple touch areas in a door lock system.

As shown in FIG. 4, multiple sensor electrodes S are respectively connected to the sensor unit 13. Therefore, the detection signal output from each of the sensor electrodes S can be individually sent to the sensor unit 13. It should be noted that FIG. 4 shows an embodiment in which the sensor unit 13, reference detection pattern setting unit 14, detection signal identifying unit 15, and touch recognition signal output unit 16 are united in a single computer.

The contact detection device 11 is connected to the controller 18. A touch recognition signal output from the touch recognition signal output unit 16 is sent to the security mode selecting unit 20, and the security mode set by the security mode setting unit 19 is selected. In a door lock system, the security mode set by the security mode setting unit 19 is one or more door lock modes.

Figures 5, 6:
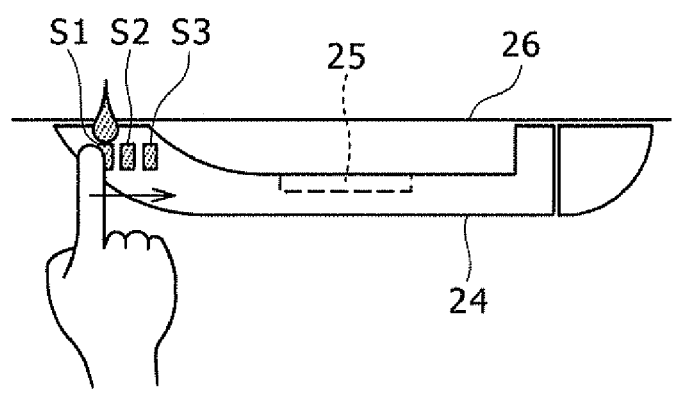
FIG. 5 is a table showing examples of touch area operation patterns (touch pattern examples) which define various door lock modes.
FIG. 6 is a drawing showing a manner in which a user operates a touch area, and how a raindrop makes a contact with the touch area.

FIG. 5 shows examples of operation patterns (touch pattern examples) of the touch areas which define various door lock modes. For any of the patterns shown in FIG. 5, multiple sensor electrodes S are used. For example, in one operation pattern, a hand is slid through the sensor electrodes in a predefined sequence (refer to FIG. 6). It is preferable to provide the door lock system with two or more door lock modes.

For example, a normal lock mode in which a normal door lock is executed and a double lock mode in which the door lock cannot be released, not only from outside but also from inside, are available. An unlock sensor 25 is often installed on an inner side of the door handle 24. However, it is also possible to perform unlocking by the operation of the sensor electrodes S so as to avoid separately providing the unlock sensor 25. Further, besides the door lock, an optional lock mode in which the windows and trunk are locked may be set.

As described above, the operation pattern used as a reference detection pattern can be a pattern which defines a touch sequence of the multiple touch areas 12. When the touch sequence of sensor electrodes S is defined, a required operation is a simple hand movement sliding on the sensor electrodes S. Further, it is possible to apply a pattern which is defined as a sliding operation repeated twice (for example, as an operation pattern of a double lock mode). When four sensor electrodes S are provided, a pattern in which sliding is performed by dividing the sensor electrodes S into two groups is possible (for example, as an operation pattern of an optional mode). Such an operation pattern cannot be reproduced by raindrops as shown in FIG. 6 but can be realized only by a human-induced touch.

Depending on the shape of the door handle 24, because raindrops may flow along the sensor electrodes S on the door handle 24, it is preferable to further define an operation time for these slide patterns. For example, it may be set such that even when the touch sequence matches, the detection signal identifying unit 15 does not declare the match if the sequence of the sliding operation is not completed within a time T1. Such a configuration can handle the situation where raindrops flow down along the arranged direction of the sensor electrodes S. As shown in FIG. 5, the operation time can be defined for each of the operation patterns such that the time period cannot be realized by raindrops, for example, a time period shorter than a period required for a raindrop flow.

Functions of the security device 10 equipped with the contact detection device 11 having the above configuration are described below by referring to FIG. 7. The description below is given assuming the contact detection device 11 as an electrostatic capacitor sensor and the security device 10 as a door lock system.

Figure 7:
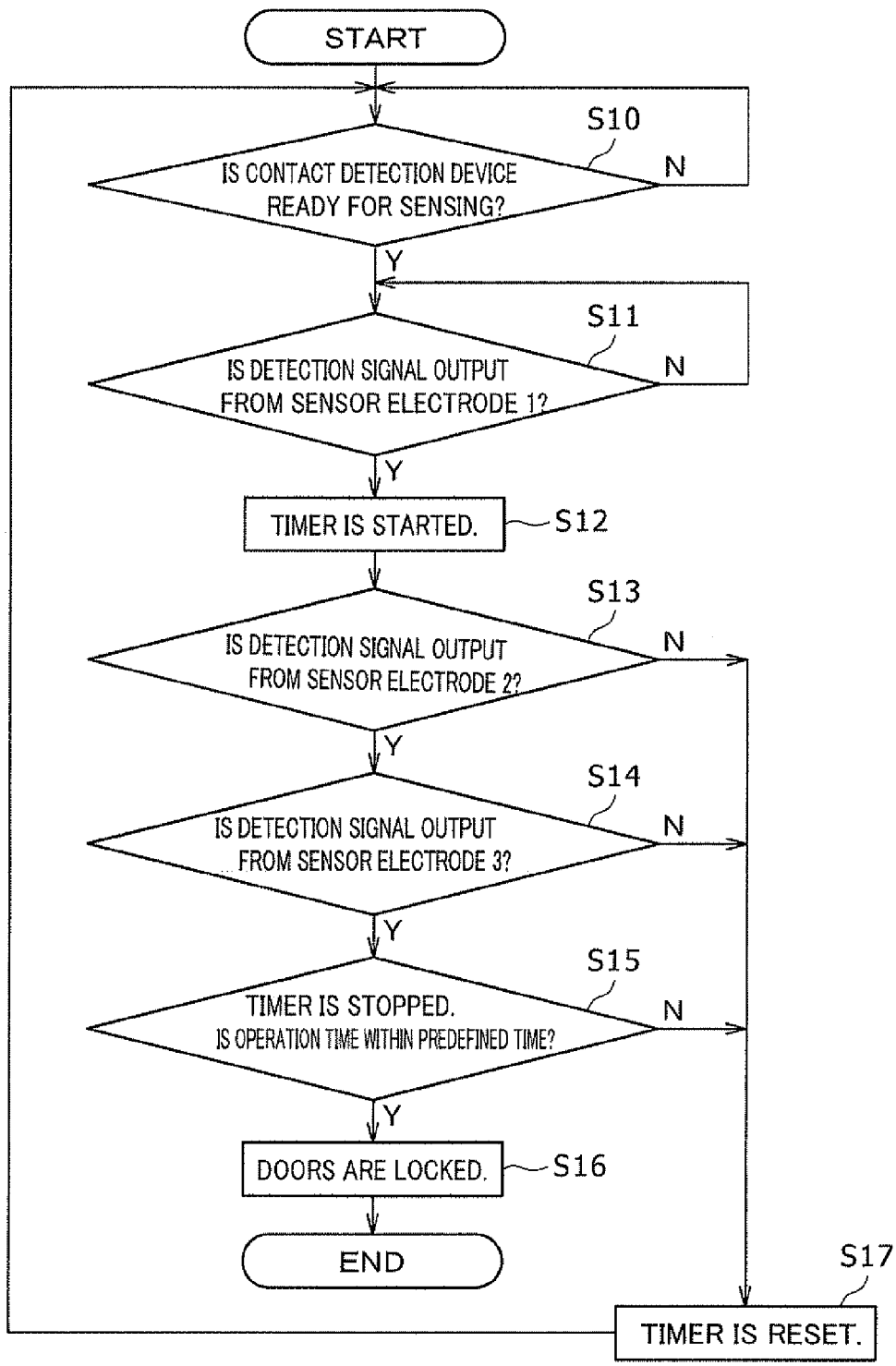
FIG. 7 is a flowchart showing an operation control sequence of a door lock system when an operation pattern defining a normal lock mode is executed.

FIG. 7 is a flowchart showing a sequence of operation control performed by the door lock system when an operation pattern defining a normal lock mode shown in FIG. 5 is performed. The description below is given assuming that the door lock system includes three sensor electrodes S which are mounted on the door lock handle 24 as shown in FIG. 3. A security mode which corresponds to a touch recognition signal is defined by using the security mode setting unit 19. Further, as the touch recognition signal corresponds to a touch pattern, a user can perform, in order to execute a desired security mode, a touch operation of the sensor electrodes S in accordance with the touch pattern corresponding to the mode.

First, it is determined whether the contact detection device 11 is in a sensing ready state (S10). It should be noted that the sensing ready state indicates that the contact detection device 11 has been activated and enabled to output a detection signal when a subject touches the sensor electrodes S. Specifically, the contact detection device 11 enter the sensing ready state when the above authenticator recognizes that a user carrying a mobile device is located within a predefined distance from the vehicle, and that the user is valid.

When it is determined that the contact detection device 11 is in the sensing ready state in S10, it is determined whether or not a sensor electrode S1 shown in FIG. 6 has output a detection signal (S11). An output of the detection signal from the sensor electrode S1 indicates that a touch of the sensor electrode S1 by a subject is recognized. The detection signal output from the sensor electrode S1 in response to the touch by the subject to the sensor electrode S1 is detected by the sensor unit 13 and compared with the reference detection pattern by the detection signal identifying unit 15 as described below.

When the sensor unit 13 detects that a detection signal has been output from the sensor electrode S1, a timer (not shown) is started (S12). The timer is provided to measure the amount of time to be compared with the time conditions included with the touch pattern corresponding to the reference detection pattern set by the reference detection pattern setting unit 14. As described above, accuracy in determination of whether or not a touch is human-induced can be improved by defining the touch time period with the touch pattern.

Then, it is determined whether or not a detection signal has been output from a sensor electrode S2 (S13).

Finally, it is determined whether or not a detection signal has been output from a sensor electrode S3 (S14). In other words, the presence or absence of output of the detection signal is determined for each of the sensor electrode in an operation sequence of the multiple sensor electrodes S defined in the touch pattern corresponding to the reference detection pattern set by using the reference detection pattern setting unit 14. When detection signals are output from these three sensor electrodes S, the detection signal identifying unit 15 recognizes these detection signals and determines whether or not the detection signals match with the reference detection pattern (the sequence of the reference detection pattern).

In the reference detection pattern, the operation time duration is defined in addition to the operation sequence as described above. Therefore, the timer is stopped when an output of the detection signal from the sensor electrode S3 is recognized, and then, it is determined whether or not the total operation time period is within the predefined time period (S15). The determination of a match with the reference detection pattern based on the operation pattern defining the operation sequence and operation time period is performed by the detection signal identifying unit 15.

When it is determined that the reference detection pattern including the operation sequence and operation time period matches with the detected detection signal, the normal lock mode is selected to lock the doors by the lock device 17. The lock mode is selected by the security mode selecting unit 20 which selects, upon receipt of the touch recognition signal, a lock mode corresponding to the signal. Therefore, when it is determined that the reference detection pattern corresponding to a touch pattern defining the operation sequence and operation time period and the detected detection signal match, the touch recognition signal is first sent to the controller 18. This function is performed by the touch recognition signal output unit 16.

As described above, the security device 10 (FIG. 1) includes the contact detection device 11 including the reference detection pattern setting unit 14, the detection signal identifying unit 15, and the touch recognition signal output unit 16. The security device 10 further includes the lock device 17 that locks vehicle components and the controller 18 that controls the operation of the lock device based on the touch recognition signal from the contact detection device for vehicular use. The controller 18 having the security mode setting unit 19 and security mode selecting unit 20 can determine whether or not the touch is human-induced to prevent an erroneous detection due to raindrops or the like. As raindrops cannot reproduce a predefined human-induced touch pattern such as a sliding pattern, the detection signal and reference detection pattern do not match. Therefore, an erroneous detection due to raindrops or the like can be prevented. Further, because the human-induced touch pattern cannot be reproduced when a person mistakenly touches the touch area, activation due to an unintentional touch can also be prevented. Further, as the touch recognition signal corresponds to a touch pattern, in order to perform a desired security mode, a user can perform a touch operation of the sensor electrodes S in accordance with a touch pattern corresponding to the mode.

As shown in FIG. 2, the security device 10 (10$t$) may include a contact detection device 11$t$, lock device 17, and controller 18$t$. The controller 18$t$ may include a mode-definition detection pattern setting unit 21, detection signal determining unit 22, and security mode specifying unit 23. The same effect as the configuration shown in FIG. 1 can be obtained by the configuration shown in FIG. 2.

The invention claimed is:

1. An electrostatic capacitance sensing system for use in a door handle of a vehicle, the electrostatic capacitance sensing system comprising:
a plurality of touch locations that a user touches, the plurality of touch locations being provided on the door handle;
a sensor unit that outputs a detection signal in response to a change in electrostatic capacitance caused when the user touches the plurality of touch locations;
a reference detection pattern setting unit that sets a predefined reference detection pattern corresponding to a pattern of human-induced touch to the plurality of touch locations, wherein
the reference detection pattern setting unit determines that the predefined reference detection pattern corresponds to a pattern of human-induced touch by analyzing: i) a given sequence of user touches to the plurality of touch locations, ii) a length of a time period between a start to an end of the given sequence of the user touches, and iii) a time interval between the user touches,
a detection signal identifying unit that compares the detection signal output by the sensor unit and the predefined reference detection pattern to determine whether or not the detection signal and the predefined reference detection pattern match; and
a touch recognition signal output unit that outputs a touch recognition signal when it is determined by the detection signal identifying unit that the detection signal output by the sensor unit and the predefined reference detection pattern match.

2. A security device for use in a vehicle having a vehicle component, the security device comprising:
the electrostatic capacitance sensing system according to claim 1;
a lock device that locks the vehicle component; and
a controller that controls an operation of the lock device based on the touch recognition signal from the electrostatic capacitance sensing system, wherein the controller includes:
a security mode setting unit that sets a security mode corresponding to the touch recognition signal output from the electrostatic capacitance sensing system; and
a security mode selecting unit that selects, in response to the touch recognition signal output from the electrostatic capacitance sensing system, a predefined security mode corresponding to the touch recognition signal, wherein the selected security mode is executed by the lock device.

3. A security device for use in a vehicle having a door handle and a vehicle component, the security device comprising:
an electrostatic capacitance sensing system that includes:
a plurality of touch locations that a user touches, the plurality of touch locations being provided on the door handle;
a sensor unit that outputs a detection signal in response to a change in electrostatic capacitance caused when the user touches the plurality of touch locations;
a lock device that locks the vehicle component; and
a controller that controls an operation of the lock device based on the detection signal from the electrostatic capacitance sensing system, wherein the controller includes:
a mode-definition detection pattern setting unit that sets a mode-definition detection pattern that corresponds to a predefined pattern of human-induced touch to the plurality of touch locations,
the mode-definition detection pattern being determined as corresponding to the predefined pattern of human-induced touch to the plurality of touch locations by analyzing (a) a sequence of user touches to the plurality of touch locations, (b) a time period between a start to an end of the sequence of the user touches, and (c) a time interval between the user touches,
the mode-definition detection pattern corresponding to a predefined security mode;
a detection signal determining unit that compares the detection signal output by the sensor unit and the mode-definition detection pattern to determine whether or not the detection signal and the mode-definition detection pattern match; and
a security mode specifying unit that specifies the predefined security mode corresponding to the mode-definition detection pattern when it is determined that the detection signal output by the sensor unit and the mode-definition detection pattern match, wherein
the specified security mode is executed by the lock device.

4. The security device according to claim 2, wherein at least two types of security modes are provided.

5. The security device according to claim 3, wherein at least two types of security modes are provided.

* * * * *